United States Patent
Schrattenecker et al.

(10) Patent No.: US 11,340,330 B2
(45) Date of Patent: May 24, 2022

(54) RADAR TRANSMITTER WITH OUTPUT PHASE CONTROL

(71) Applicant: Infineon Technologies AG, Neubiberg (DE)

(72) Inventors: Jochen O. Schrattenecker, Reichenthal (AT); Lukas Heschl, Linz (AT); Helmut Kollmann, Linz (AT); Mathias Zinnoecker, Linz (AT)

(73) Assignee: Infineon Technologies AG, Neubiberg (DE)

( * ) Notice: Subject to any disclaimer, the term of this patent is extended or adjusted under 35 U.S.C. 154(b) by 355 days.

(21) Appl. No.: 16/556,708

(22) Filed: Aug. 30, 2019

(65) Prior Publication Data

US 2020/0072940 A1 Mar. 5, 2020

(30) Foreign Application Priority Data

Sep. 3, 2018 (DE) .......................... 102018121416.2

(51) Int. Cl.
*G01S 7/35* (2006.01)
*G01S 13/42* (2006.01)

(52) U.S. Cl.
CPC .............. *G01S 7/35* (2013.01); *G01S 13/42* (2013.01)

(58) Field of Classification Search
CPC .................................. G01S 7/35; G01S 13/42
See application file for complete search history.

(56) References Cited

U.S. PATENT DOCUMENTS

| 5,075,635 A | * | 12/1991 | Boulanger | H03F 1/3247 330/149 |
| 7,154,432 B2 | * | 12/2006 | Nagasaku | G01S 7/032 342/27 |
| 9,083,350 B1 | * | 7/2015 | Posner | H03L 7/0816 |
| 2004/0012447 A1 | * | 1/2004 | Nagaishi | H03L 7/185 331/2 |
| 2013/0113653 A1 | * | 5/2013 | Kishigami | G01S 7/4021 342/189 |

FOREIGN PATENT DOCUMENTS

| DE | 112014005387 T5 | 8/2016 |
| DE | 102017119212 A1 | 6/2018 |
| GB | 2414352 A | 11/2005 |

* cited by examiner

*Primary Examiner* — Erin F Heard
*Assistant Examiner* — Taher Al Sharabati
(74) *Attorney, Agent, or Firm* — Harrity & Harrity, LLP

(57) ABSTRACT

A radar transmitter is described. The radar transmitter may include the following: a transmit channel which is designed to receive a local oscillator signal and to generate a high-frequency (HF) radar signal based on the local oscillator signal; a phase shifter contained in the transmit channel which is designed to set a phase of the HF radar signal depending on an input phase value; and a coupler contained in the transmit channel which is designed to receive the HF radar signal and output the HF radar signal at an output contact. A phase controller circuit is assigned to the transmit channel, where the circuit is coupled with the coupler and is designed to receive the local oscillator signal and the HF radar signal, and to adjust the input phase value for the phase shifter based on a phase difference between the local oscillator signal and the HF radar signal.

20 Claims, 5 Drawing Sheets

RADAR TRANSMITTER WITH OUTPUT PHASE CONTROL

CROSS REFERENCE TO RELATED APPLICATIONS

This application claims priority under 35 U.S.C. § 119 to German Patent Application No. 102018121416.2 filed on Sep. 3, 2018, the contents of which are incorporated by reference herein in their entirety.

TECHNICAL AREA

The present description relates to the field of high-frequency (HF) circuits and to radar transmitter circuits such as e.g. those used in radar sensors for measuring the distance and speed of radar targets.

BACKGROUND

High-frequency (HF) transmitters and receivers are found in various applications, especially in the field of wireless communication and radar sensors. In the automotive sector, there is a growing need for radar sensors which can be used, inter alia, in advanced driver assistance systems (ADAS) such as e.g. Adaptive Cruise Control (ACC) or Radar Cruise Control systems. Systems of this type can automatically adjust the speed of an automobile to maintain a safe distance from other automobiles driving in front (and from other objects and pedestrians). Other applications in the automotive sector are e.g. blind spot detection, lane change assist, and the like. However, radar sensors can also be used in other industrial applications.

Modern radar systems use highly integrated HF circuits which can contain all the core functions of an HF front-end of a radar transmitter or radar transceiver in a single-chip housing (single-chip transceiver). HF front-ends of this type may have, inter alia, an HF local oscillator (LO), power amplifiers, low-noise amplifiers (LNA) or mixers. Integrated circuits of this type are often also referred to as monolithically microwave integrated circuits (MMICs).

Frequency-modulated continuous-wave (FMCW) radar systems use radar signals which contain sequences of chirps. To generate chirps of this type, the radar device may have a local oscillator, which has a voltage-controlled oscillator (VCO) disposed in a phase-locked loop (PLL). A chirp sequence is normally transmitted via a plurality of transmit channels and the associated transmit antennas for a measurement.

SUMMARY

For high-resolution detection (distance, velocity and azimuth angle (e.g. Direction of Arrival, DoA)) of radar targets, it can be beneficial to adjust phase differences of transmitted chirp sequences with sufficient accuracy.

A radar transmitter is described. According to one example implementation, the radar transmitter has the following: a transmit channel which is designed to receive a local oscillator signal and generate an HF radar signal on the basis of the local oscillator signal; a phase shifter contained in the transmit channel which is designed to adjust a phase of the HF radar signal depending on an input phase value; and a coupler contained in the transmit channel which is designed to receive the HF radar signal and output the HF radar signal at an output contact. A phase controller circuit is assigned to the transmit channel, said circuit being coupled with the coupler and being designed to receive the local oscillator signal and the HF radar signal, and to adjust the input phase value for the phase shifter on the basis of a phase difference between the local oscillator signal and the HF radar signal.

A method for a radar transmitter is furthermore described. According to one example implementation, the method comprises generating an HF radar signal in a transmit channel of a radar transmitter on the basis of a local oscillator signal; the decoupling of a part of the power of the HF radar signal using a coupler connected to the output of the transmit channel and providing the decoupled HF radar signal; and adjusting the phase of the HF radar signal on the basis of the local oscillator signal and the HF radar signal using a phase shifter disposed in the transmit channel.

BRIEF DESCRIPTION OF THE DRAWINGS

Example implementations are explained in detail below on the basis of illustrations. The representations are not necessarily true-to-scale and the example implementations are not limited only to the aspects presented. Rather, the representations focus on presenting the principles underlying the example implementations.

DETAILED DESCRIPTION

Figure 1:
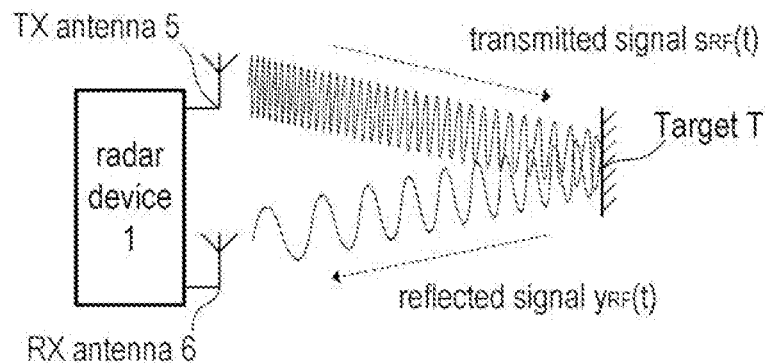
FIG. 1 is a diagram illustrating the operating principle of an FMCW radar system for distance and/or speed measurement.

FIG. 1 illustrates in a schematic diagram showing the use of an FMCW radar system, as a sensor for measuring distances and speeds of objects which are usually referred to as radar targets. In the present example, the radar device 1 has separate transmit (TX) and receive (RX) antennas 5 or 6 (bistatic or pseudo-monostatic radar configuration). It should be noted, however, that one or more antennas can also be used which simultaneously serve as transmit antennas and receive antennas (monostatic radar configuration). In the present example, the transmit antenna 5 emits a continuous HF signal $s_{RF}(t)$ which is frequency-modulated, for example, with a type of sawtooth signal (periodic, linear frequency ramp). The emitted signal $s_{RF}(t)$ is backscattered at the radar target T and the backscattered/reflected signal $y_{RF}(t)$ is received by the receive antenna 6. FIG. 1 shows a simplified example; in practice, radar sensors are systems equipped with a plurality of transmit (TX) and receive (RX) channels in order to be able also to define the azimuth angle of a radar target, e.g. the Direction of Arrival (DoA) of the backscattered/reflected signal $y_{RF}(t)$ and thus locate the radar target T with the desired resolution.

Figure 2:
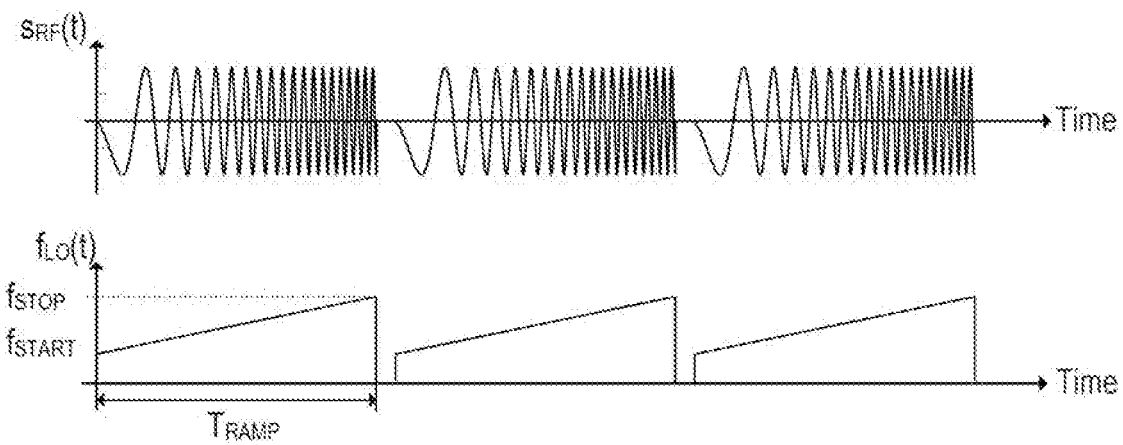
FIG. 2 provides two timing diagrams illustrating the frequency modulation (FM) of the HF signal generated by the FMCW system.

FIG. 2 illustrates, by way of example, the aforementioned frequency modulation of the signal $s_{RF}(t)$. As shown in FIG. 2 (upper diagram), the emitted HF signal $s_{RF}(t)$ is composed of a set of chirps, e.g. the signal $s_{RF}(t)$ comprises a sequence of sinusoidal waveforms with increasing frequency (up-chirp) or decreasing frequency (down-chirp). In the present example, the instantaneous frequency $f_{LO}(t)$ of the chirps increases beginning at a start frequency $f_{START}$ within a time period $T_{RAMP}$ linear to a stop frequency $f_{STOP}$ (see lower diagram in FIG. 2). Such chirps are also referred to as linear frequency ramps. FIG. 2 shows three identical linear frequency ramps. It should be noted, however, that the parameters $f_{START}$, $f_{STOP}$, $T_{RAMP}$ as well as the pause between the individual frequency ramps may vary. The frequency variation also does not necessarily have to be linear (linear chirp). Depending on the implementation, transmit signals with exponential or hyperbolic frequency variation (exponential or hyperbolic chirps), for example, can also be used. However, linear chirp sequences are used in many applications.

Figure 3:
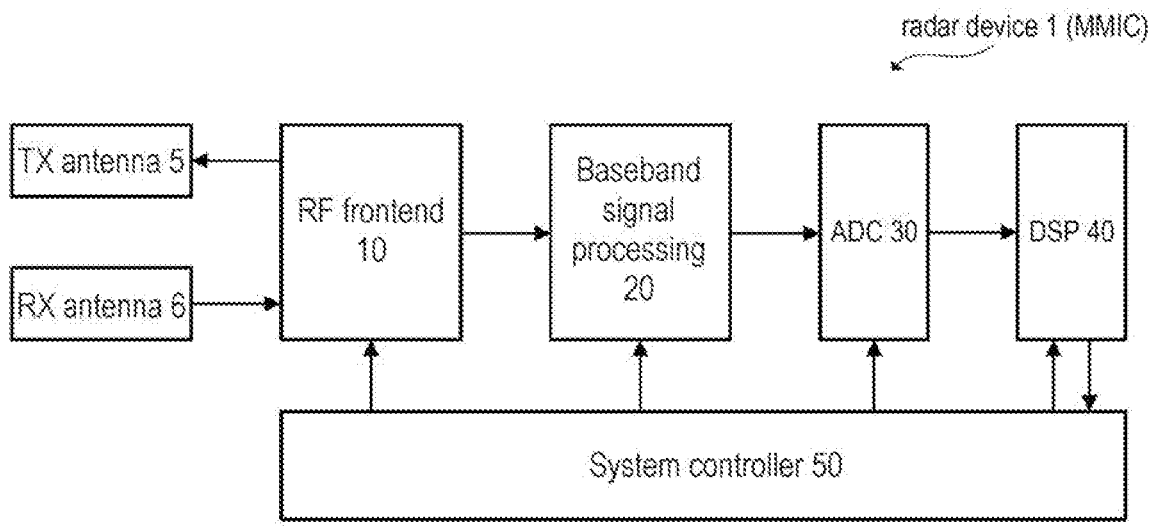
FIG. 3 is a block diagram illustrating the basic structure of an FMCW radar system.

FIG. 3 is a block diagram showing, by way of example, a possible structure of a radar device 1 (radar sensor). Accordingly, at least one transmit antenna 5 (TX antenna) and at least one receive antenna 6 (RX antenna) are connected to an HF front-end 10 integrated into a radar chip (MMIC) which can contain all those circuit components which are used for the HF signal processing. These circuit components comprise, for example, a local oscillator (LO), HF power amplifiers, low-noise amplifiers (LNA), directional couplers (e.g. rat-race couplers, circulators, etc.) and mixers for the down-conversion of the HF signals into the baseband or an intermediate frequency band (IF band).

The example shown in FIG. 3 shows a bistatic (or pseudo-monostatic) radar system with separate RX and TX antennas. In the case of a monostatic radar system, a single antenna would be used to both emit and receive the electromagnetic (radar) signals. In this case, a directional coupler (e.g. a circulator) can be used to separate the HF signals to be emitted from the received HF signals (radar echo signals). As mentioned above, radar systems usually have a plurality of transmit and receive channels (TX/RX channels) with a plurality of TX and RX antennas in practice, which enables, inter alia, a measurement of the direction (DoA) from which the radar echoes are received. In MIMO systems of this type, the individual TX channels and RX channels are normally in each case the same or similar. The TX channels and/or the RX channels can be distributed among a plurality of MMICs.

In the case of an FMCW radar system, the HF signals emitted via the TX antenna 5 can be e.g. in the range from approx. 20 GHz to 100 GHz (e.g. around 77 GHz in some applications). As mentioned, the HF signal received by the RX antenna 6 comprises the radar echoes (chirp echo signals), e.g. those signal components which are backscattered at one or more radar targets. The received HF signal $y_{RF}(t)$ is down-converted into the baseband (or an IF band) and further processed in the baseband using analog signal processing (see FIG. 3, analog baseband signal processing chain 20). The aforementioned analog signal processing in the baseband basically comprises a filtering and, if useful, an amplification of the baseband signal. The baseband signal is finally digitized (see FIG. 3, analog-digital converter 30) and further processed in the digital domain.

The digital signal processing chain can be implemented at least partially as software which can be run in a digital computing unit 40 (e.g. with a processor such as e.g. a microcontroller or digital signal processor, see FIG. 3, DSP). The entire system is normally controlled by a system controller 50 which can also be implemented at least partially as software which can be run on a computing unit (e.g. a processor such as e.g. a microcontroller). The HF front-end 10 and the analog baseband signal processing chain 20 (and optionally also the analog-digital converter 30 and parts of the computing unit 40) can be integrated jointly into a single MIMIC (e.g. an HF semiconductor chip). Alternatively, the individual components can also be distributed among a plurality of integrated circuits. In some radar systems, the operation of the computing unit 40 which processes the digitized radar signals can be at least partially transferred to a central computing unit.

Figure 4:
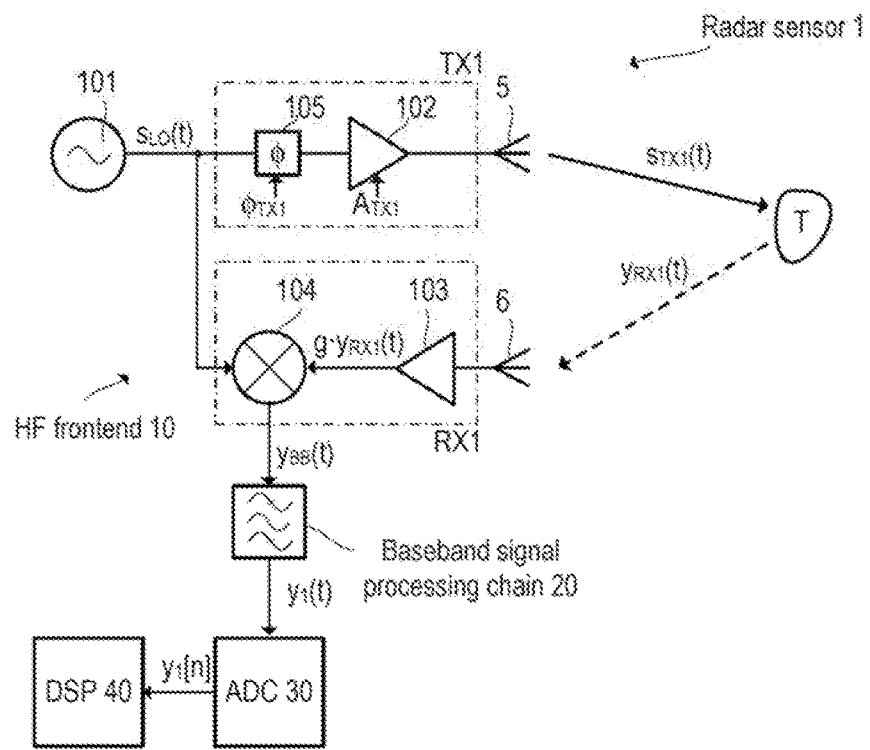
FIG. 4 is a block diagram illustrating an example of an integrated HF front-end circuit of a radar chip including analog baseband signal processing.

FIG. 4 illustrates in more detail an example of the implementation of a radar device 1 as shown in FIG. 3. In the present example, in particular, the HF front-end 10 of the radar device 1 and the downstream signal processing in the baseband are shown. It should be noted that FIG. 4 represents a simplified circuit diagram to show the basic structure of the HF front-end 10 with a TX channel TX1 and an RX channel RX1. Actual implementations, which can depend heavily on the specific application, can of course be more complex and can have a plurality of similar TX and RX channels. As mentioned, in the case of a large number of TX and RX channels and corresponding TX and RX antennas, for example, the HF front-end can be distributed among a plurality of radar chips (MMIC s).

The HF front-end 10 includes a local oscillator 101 (LO) which generates an HF oscillator signal $s_{LO}(t)$. As described above with reference to FIG. 2, the HF oscillator signal $s_{LO}(t)$ comprises sequences of frequency-modulated chirps and is also referred to as an LO signal. In radar applications, the frequency $f_{LO}$ of the LO signal $s_{LO}(t)$ is usually in the SHF (Super High Frequency, centimeter wave) or in the EHF (Extremely High Frequency, millimeter wave) band, e.g. in the interval from 76 GHz to 81 GHz. The LO signal $s_{LO}(t)$ is processed in both the transmit signal path TX1 (in the TX channel) and in the receive signal path RX1 (in the RX channel). The local oscillator 101 usually contains a voltage-controlled oscillator (VCO) which is connected in a phase-locked loop (PLL). The phase-locked loop may, for example, have a multi-modulus divider which is digitally controlled via a sigma-delta modulator to set the LO frequency $f_{LO}$. Local oscillators with phase-locked loops of this type are known per se and will not therefore be explained in detail here.

The transmit signal $s_{TX1}(t)$ (cf. FIG. 2), which is emitted by the TX antenna 5 is generated by amplifying the LO signal $s_{LO}(t)$, for example, using the HF power amplifier 102. In addition, the phase $\phi_{TX1}$ of the radiated signal can be set using a phase shifter 105 in the TX channel TX1. The amplification $A_{TX1}$ of the amplifier 102 can also be adjustable. The transmit signal $s_{TX1}(t)$ is thus simply an amplified and possibly phase-shifted version of the LO signal $s_{LO}(t)$. A phase setting may be used, particularly in a radar system with a plurality of TX channels. The output of the amplifier 102 can be coupled with the TX antenna 5 (e.g. via a directional coupler and a matching network for impedance matching, (not shown)).

The receive signal $y_{RFX1}(t)$ which is received by the RX antenna 6 is fed to the receiver circuit in the RX channel RX1 and therefore directly or indirectly (e.g. via a directional coupler (not shown)) to the HF port of the mixer 104. In the present example, the HF receive signal $y_{RX1}(t)$ (antenna signal) is pre-amplified using the amplifier 103 (amplification g). The mixer 104 therefore receives the amplified HF receive signal $g \cdot y_{RX1}(t)$. The amplifier 103 may, for example, be an LNA. The LO signal $s_{LO}(t)$ is fed to the reference port of the mixer 104 so that the mixer 104 down-converts the (pre-amplified) HF receive signal $y_{RX1}(t)$ into the baseband. The signal (mixer output signal) down-converted into the baseband is denoted $y_{BB}(t)$ in FIG. 4. This baseband signal $y_{BB}(t)$ initially undergoes analog further processing, wherein the analog baseband signal processing chain 20 may cause an amplification and a (e.g. bandpass or low-pass) filtering in order to suppress unwanted sidebands and mirror frequencies. The resulting analog output signal which is fed to an analog-digital converter (see FIG. 3, ADC 30), is denoted $y_1(t)$. Methods for the digital further processing of the digitized output signal (digital radar signal $y_1[n]$) for the detection of radar targets are known per se (e.g. Range-Doppler analysis) and are therefore not explained in more detail here.

In the present example, the mixer 104 down-converts the pre-amplified HF receive signal $g \cdot y_{RF}(t)$ (e.g. the amplified antenna signal) into the baseband. The mixing can take place in one stage (e.g. from the HF band directly into the baseband) or via one or more intermediate stages (e.g. from the HF band into an intermediate frequency band and further into the baseband).

As mentioned, radar transmitters or transceivers can have a plurality of transmit channels and receive channels. For a precise radar measurement, the (e.g. preset) phase differences between the emitted HF radar signals should not change. However, the phases of the output signals of the individual transmit channels are subject to a temperature drift. Furthermore, aging effects can influence the phases.

Figure 5:
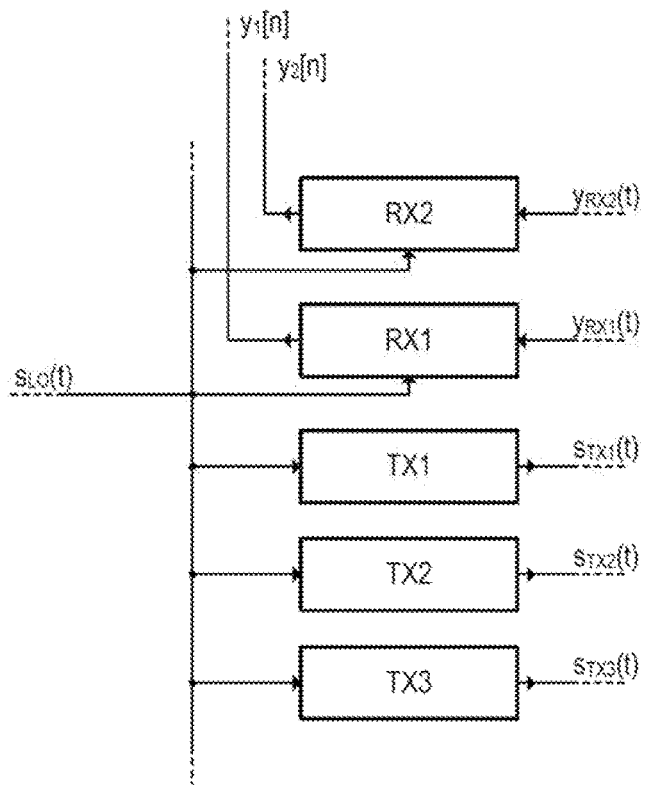
FIG. 5 is a block diagram illustrating an example of a radar transceiver with a plurality of transmit channels and a plurality of receive channels.

FIG. 5 illustrates schematically a system with a plurality of transmit channels TX1, TX2, TX3, etc., and a plurality of receive channels RX1, RX2, etc., which can be integrated into an MIMIC, for example. The LO signal $s_{LO}(t)$ is fed to all transmit channels and the transmit channels generate corresponding output signals $s_{TX1}(t)$, $s_{TX2}(t)$, $s_{TX3}(t)$, etc. (antenna signals) which are emitted via corresponding transmit antennas (not shown). As mentioned, the output signals $s_{TX1}(t)$, $s_{TX2}(t)$, $s_{TX3}(t)$, etc. may be amplified and phase-shifted versions of the LO signal $s_{LO}(t)$.

FIG. 5 also shows the receive channels RX1, RX2, etc. The HF signals $y_{RX1}(t)$, $y_{RX2}(t)$, etc., received by the receive antennas are fed to the receive channels RX1, RX2, etc., which are designed to down-convert the received HF signals $y_{RX1}(t)$, $y_{RX2}(t)$, etc., into the baseband and provide corresponding digital radar signals $y_1[n]$, $y_2[n]$, etc. The structure of the transmit and receive channels has already been explained above with reference to FIG. 4.

As mentioned, the phases $\phi_{TX1}$, $\phi_{TX2}$, $\phi_{TX3}$, etc., of the output signals $s_{TX1}(t)$, $s_{TX2}(t)$, $s_{TX3}(t)$, etc., of the transmit channels TX1, TX2, TX3, etc., can be adjusted and modified using phase shifters (cf. FIG. 4, phase shifter 105). The phase differences (e.g. $\phi_{TX2}-\phi_{TX1}$, $\phi_{TX3}-\phi_{TX1}$) are relevant for an accurate measurement. However, these phase differences may change, as the phases $\phi_{TX1}$, $\phi_{TX2}$, $\phi_{TX3}$ are subject to a drift, for example due to temperature changes of the components disposed in the transmit channels. The approach described by way of example on the basis of the following implementations enables a control of the phase of the output signal of each transmit channel in order to keep the respective phase stable and to compensate, for example, a temperature-dependent drift.

The example according to FIG. 1 illustrates a part of an HF front-end of a radar transmitter, wherein those components which are not needed for the following discussion have been omitted in order to simplify the representation. According to FIG. 6, a local oscillator 101 generates an LO signal $s_{LO}(t)$ which is distributed to one or more transmit channels TX1, etc., and one or more receive channels RX1, etc. This distribution of the LO signal $s_{LO}(t)$ is already shown schematically in FIG. 5. In most practical implementations, this LO signal distribution is accomplished using a signal distribution structure 107, such as an HF signal distribution circuit, with one or more power dividers. The power divider can be a passive structure made of striplines (e.g. Wilkinson dividers). It should be noted at this juncture that passive circuit structures cause no or only very slight temperature-dependent phase changes.

The LO signal $s_{LO}(t)$ is fed not only to the transmit channel TX1, but also to the phase controller circuit 108, which is assigned to the transmit channel TX1. In one example with a plurality of transmit channels, a controller circuit 108 can be assigned to each transmit channel. According to FIG. 6 the transmit channel TX1 comprises a phase shifter 105 and an amplifier 102 as in the previous example from FIG. 4. In addition, the transmit channel TX1 comprises a coupler 106 which is designed to decouple (to branch off) a (comparatively small) part of the power of the transmit signal $s_{TX01}(t)$ and feed it to the phase controller circuit 108. The branched off output signal is denoted $s_{TX1}'(t)$ and has the same phase $\phi_{TX1}$ as the output signal $s_{TX1}(t)$ which is output at the output contact TA1 (e.g. chip pin or solder ball) to an antenna.

Figure 6:
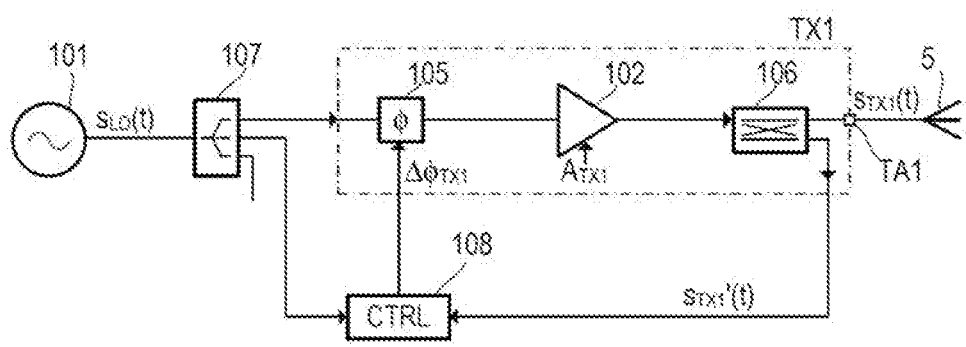
FIG. 6 is a block diagram illustrating an example of a phase controller circuit to compensate phase drift in a transmit channel.

In the following discussion, the phase shift caused by the transmit channel TX1 is assumed as $\phi_{LO}-\phi_{TX1}$, wherein this phase shift includes the phase shift $\Delta\phi_{TX1}$ caused by the phase shifter 105. The phase shift $\phi_{LO}-\phi_{TX1}$ corresponds accordingly to the phase difference between the LO signal $s_{LO}(t)$ which is fed to the transmit channel TX1 and the resulting output signal $s_{TX1}(t)$ of the transmit channel TX1. As shown in FIG. 6, the LO signal $s_{LO}(t)$ and the branched off output signal $s_{TX1}'(t)$ of the transmit channel TX1 are fed to the phase controller circuit 108, and the phase controller circuit 108 is designed to adjust the input phase value $\Delta\phi_{TX1}$ for the phase shifter 105 on the basis of the phase difference $\phi_{LO}-\phi_{TX1}$. The input phase value $\Delta\phi_{TX1}$ for the phase shifter 105 is controlled in such a way that the phase difference $\phi_{LO}-\phi_{TX1}$ is equal to a wanted, predefined (e.g. settable) value. Unwanted fluctuations (e.g. due to temperature changes) can thus be compensated continuously.

Figure 7:
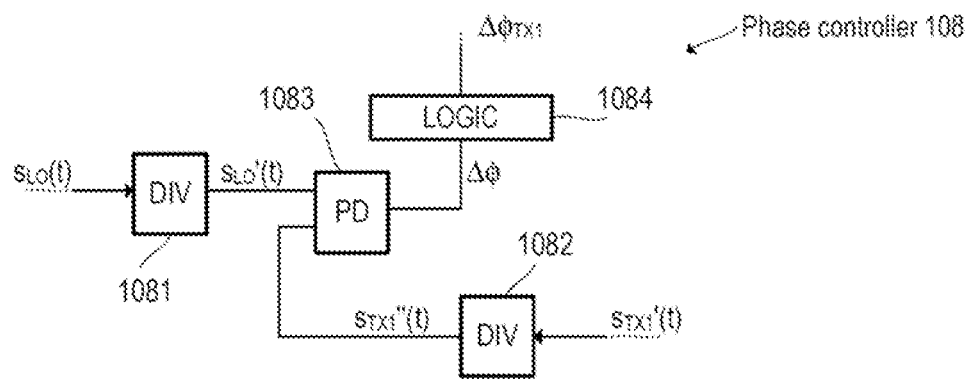
FIG. 7 illustrates an example implementation of the phase controller circuit in more detail.

FIG. 7 illustrates an example of an implementation of the phase controller circuit 108. According to FIG. 7, the phase controller circuit 108 comprises frequency dividers 1081 and 1082 which are designed in each case to reduce the frequency of the LO signal $s_{LO}(t)$ or the branched off output signal $s_{TX1}(t)$ by a factor, such as by a constant integer divider N. The divider N may, for example, be 256. In this example, a frequency of $f_{LO}=80$ GHz would be reduced to 312.5 MHz. The frequency-divided signals are denoted $s_{LO}'(t)$ and $s_{TX1}''(t)$ in FIG. 7. The phase difference $\phi_{LO}-\phi_{TX1}$ is not affected by the frequency division. This means that the phase difference between the frequency-divided signals $s_{LO}'$ (t) and $s_{TX1}''(t)$ is equal to the phase difference between the "original" signals $s_{LO}(t)$ and $s_{TX1}(t)$.

The frequency-divided signals $s_{LO}'(t)$ and $s_{TX1}''(t)$ are fed to a phase detector circuit 1083 which is designed to generate a phase difference signal $\Delta\phi$ representing the phase difference $\phi_{LO}-\phi_{TX1}$ between the frequency-divided LO signal $s_{LO}'(t)$ and the frequency-divided branched off output signal $s_{TX1}''(t)$. Phase detector circuits which are frequently used e.g. in phase-locked loops also, are known per se and are therefore not further explained here. The phase difference signal $\Delta\phi$ may, for example, be a pulse-width-modulated signal whose duty-cycle represents the phase difference $\phi_{LO}-\phi_{TX1}$. In the example shown, the phase difference signal $\Delta\phi$ is fed to a logic circuit 1084 which is designed to determine the input phase value $\Delta\phi_{TX1}$ on the basis of the phase difference signal $\Delta\phi$ in such a way that the phase difference $\phi_{LO-TX1}$ caused by the transmit channel TX1 corresponds to a desired value (e.g. zero degrees).

The logic circuit 81 may comprise e.g. a control circuit which implements a certain transfer function. This transfer function can be implemented e.g. using CORDIC (Coordinate Rotation Digital Computer) algorithms which can be implemented comparatively easily in digital circuit technology (e.g. FPGAs). In this way, the control circuit can, for example, create a P (Proportional) controller characteristic or a PI (Proportional Integral) controller characteristic.

Figure 8A:
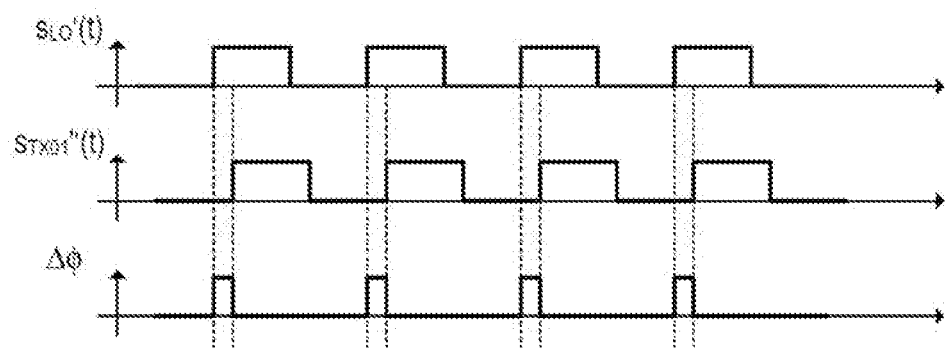
FIGS. 8A and 8B provide timing diagrams to illustrate, by way of example, the mode of operation of a phase detector which can be used in the phase controller circuit from FIG. 7.
Figure 8B:
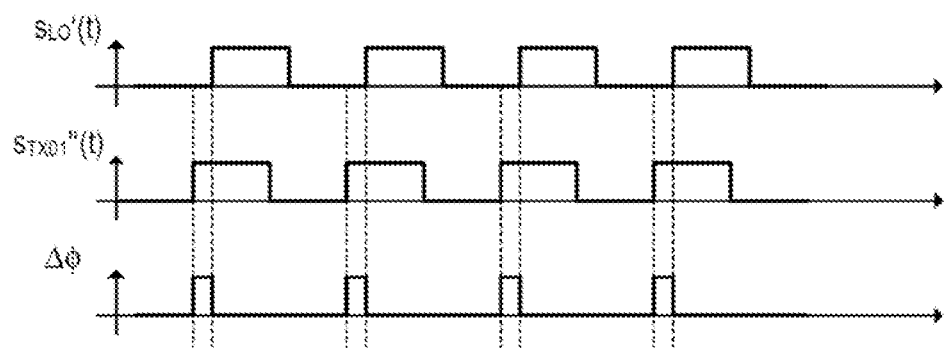

FIGS. 8A and 8B provide timing diagrams to illustrate the operation of the phase detector circuit 1083 from FIG. 7. FIG. 8A relates to the case where the signal $s_{TX1}''(t)$ lags behind the frequency-divided LO signal $s_{LO}'(t)$. The phase difference signal z can be generated, for example, by a simple logic operation. In the example shown, the phase difference signal $\Delta\phi$ is at a high level if the signal $s_{LO}'(t)$ has a high level and the signal $s_{TX1}''(t)$ has a low level. The duty cycle (between 0 and 50%) of the resulting phase difference signal $\Delta\phi$ represents the phase difference $\phi_{LO}-\phi_{TX1}$ between −180° and 0 degrees. FIG. 8B relates to the case where the frequency-divided LO signal $s_{LO}'(t)$ lags behind the signal $s_{TX1}''(t)$. In this case, the phase difference signal $\Delta\phi$ is at a high level if the signal $s_{LO}'(t)$ has a low level and the signal $s_{TX1}''(t)$ has a high level. The duty cycle (between 0 and 50%) of the resulting phase difference signal z represents the phase difference $\phi_{LO}-\phi_{TX1}$ between 0 and 180 degrees. With a phase shift of 0 degrees, it is possible to "toggle" between the situations in FIGS. 8A and 8B, and only duty cycles between 0 and 50% are considered which correspond to phase shifts between −180 and 180 degrees.

Figure 9:
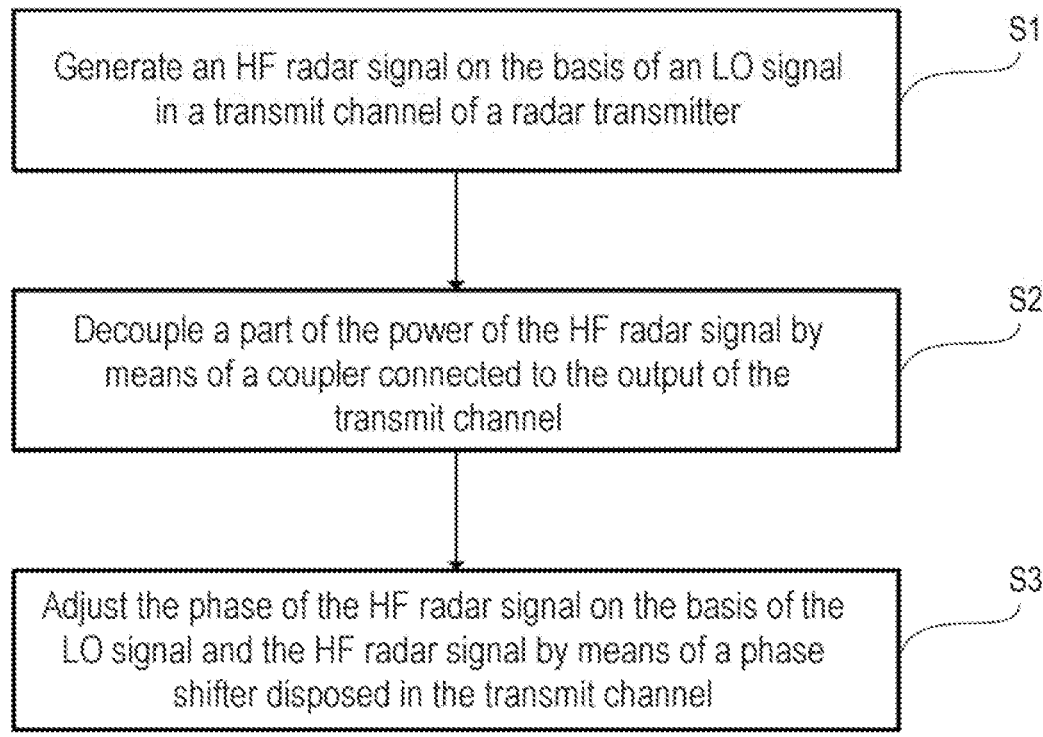
FIG. 9 is a flow diagram illustrating an example of the method described here for compensating phase drift in a transmit channel of an FMCW radar system.
Figure 10:
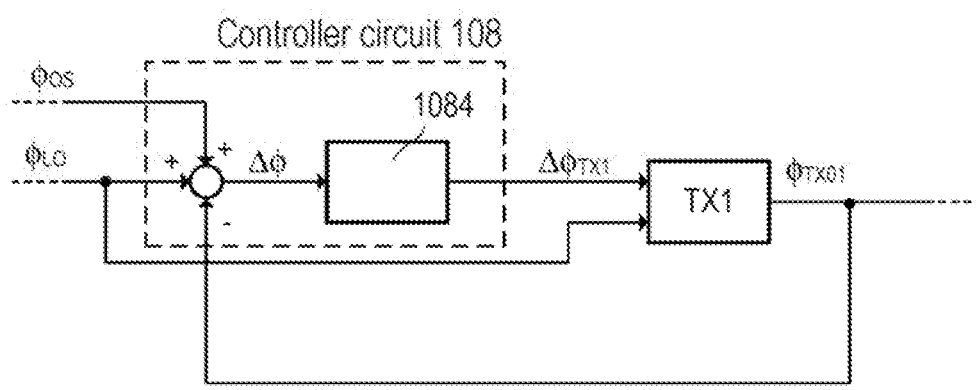
FIG. 10 illustrates, by way of example, the control loop implemented by the example implementation from FIG. 6 or 7 with output phase feedback.

FIG. 9 is a flow diagram which is an example of a method for controlling the phase of the HF radar signal output by a transmit channel (see FIG. 6, output signal $s_{TX1}(t)$). FIG. 10 illustrates as a block diagram the associated control loop with feedback of the output phase $\phi_{TX1}$ (phase of the output HF radar signal $s_{TX1}(t)$). With regard to FIG. 10, it should be noted that the method steps described in FIG. 9 do not entail any sequence. Instead, the activities presented may be carried out simultaneously.

According to FIG. 9, an HF radar signal is generated and output on the basis of a local oscillator signal in a transmit channel of a radar transmitter (or the transmitter part of a radar transceiver, see FIG. 9, step S1). Reference is also made in this respect to the block diagram from FIG. 6 according to which the local oscillator signal $s_{LO}(t)$ is phase-shifted and amplified in the transmit channel TX1 and the phase-shifted and amplified signal $s_{TX1}(t)$ is output at the output TA1 as an HF radar signal. A part of the power of the HF radar signal is decoupled at the output of the transmit channel, e.g. is branched off using a coupler (see FIG. 9, step S2, and FIG. 6, directional coupler 106). The phase of the HF radar signal is adjusted on the basis of the local oscillator signal and the (branched off) HF radar signal (see FIG. 9, step S3). This adjustment entails a feedback of the output phase $\phi_{TX1}$, as shown in FIG. 10.

According to FIG. 10, the transmit channel TX1 obtains the input phase value $\Delta\phi_{TX1}$ for the phase shifter contained in the transmit channel (see FIG. 6, phase shifter 105) and the phase $\phi_{LO}$ of the local oscillator signal and generates the HF radar signal with a phase $\phi_{TX1}$ as the output signal (output phase). The output phase $\phi_{TX1}$ is adjusted on the basis of the phases $\phi_{LO}$ and $\phi_{TX1}$ (by adjusting the input phase value $\Delta\phi_{TX1}$ of the phase shifter 105 contained in the transmit channel, see FIG. 6). The output signal of the phase controller circuit 108 is therefore the input phase value $\Delta\phi_{TX1}$ of the phase shifter contained in the transmit channel. The phase controller circuit 108 initially determines a phase difference $\phi_{LO}-\phi_{TX1}$ (e.g. using a phase detector, cf. FIG. 6) and calculates the desired phase shift $\Delta\phi_{TX1}$ of the phase shifter from this phase difference $\phi_{LO}-\phi_{TX1}$. As already mentioned, this calculation can be carried out by a logic circuit 1084 which can implement any suitable transmission function (e.g. P controller or PI controller transmission function). According to FIG. 10, a desired predefinable phase offset dos can also be superimposed on the phase difference $\phi_{LO}-\phi_{TX1}$. In this case, the phase difference $\phi_{LO}-\phi_{TX1}$ is not adjusted to zero but to dos. As already mentioned, a phase controller circuit can be assigned to each transmit channel and the phase offset $\phi_{OS}$ can be set separately for each channel in order to obtain a desired radiation pattern of the antennas.

It should be noted that the active control of the phase can be active not only during a calibration of the radar transceiver. The control of the phase through feedback of the output phase $\phi_{TX1}$ of a transmit channel can also be active during the performance of a radar measurement, while the LO signal is usually frequency-modulated in order to generate sequences of chirps (cf. FIG. 2) which are emitted as an HF radar signal. In addition or alternatively, the calibration can be carried out before or after a radar measurement with an unmodulated LO signal (continuous-wave signal). A calibration can furthermore be repeated at regular intervals, for example, if the temperature of the radar transceiver has changed by a certain value.

In the examples described here, the local oscillator 101, the transmit channel TX1 (and possibly other transmit channels) and the phase controller circuit 108 assigned to the transmit channel TX1 are integrated into an MMIC. However, the control loop shown schematically in FIG. 10 can also operate beyond chip boundaries. In an alternative example implementation, the local oscillator 101 is integrated into a first MMIC, whereas the transmit channel TX1 (and possibly other transmit channels) and the phase controller circuit 108 assigned to the transmit channel TX1 are integrated into a second MMIC. In this case, the two MMICs can be disposed e.g. on a printed circuit board, and the LO signal is transmitted, for example, using a strip line disposed on the printed circuit board from the first MMIC to the second MMIC.

The foregoing disclosure provides illustration and description, but is not intended to be exhaustive or to limit the aspects to the precise form disclosed. Modifications and variations may be made in light of the above disclosure or may be acquired from practice of the disclosure.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set.

No element, act, or instruction used herein should be construed as critical or essential unless explicitly described as such. Also, as used herein, the articles "a," "an," and "the" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

The invention claimed is:

1. A radar transmitter, comprising:
  a transmit channel which is designed to receive a local oscillator signal and to generate a high-frequency (HF) radar signal based on the local oscillator signal;
  a phase shifter disposed in the transmit channel and which is designed to set a phase of the HF radar signal depending on an input phase value;
  a coupler disposed in the transmit channel and which is designed to receive the HF radar signal and output the HF radar signal at an output contact; and
  a phase controller circuit assigned to the transmit channel, which is coupled with the coupler, designed to receive the local oscillator signal and the HF radar signal, and to adjust the input phase value for the phase shifter based on a phase difference between the local oscillator signal and the HF radar signal,
    wherein the phase controller circuit comprises a first frequency divider that reduces a first signal related to the local oscillator signal and a second frequency divider that reduces a second signal related to the HF radar signal,
    wherein the phase controller circuit comprises a phase detector circuit coupled to an output of the first frequency divider and an output of the second frequency divider to generate a phase difference signal representing the phase difference, and
    wherein the phase controller circuit comprises a logic circuit to receive the phase difference signal and to determine the input phase value based on the phase difference signal.

2. The radar transmitter as claimed in claim 1, wherein the logic circuit comprises a control circuit implementing a transfer function.

3. The radar transmitter as claimed in claim 2, wherein the transfer function is implemented by a Coordinate Rotation Digital Computer (CORDIC) algorithm.

4. The radar transmitter as claimed in claim 1, further comprising:
  an HF signal distribution circuit which is designed to receive the local oscillator signal from a local oscillator and distribute the local oscillator signal to the transmit channel and the phase controller circuit assigned to the transmit channel.

5. The radar transmitter as claimed in claim 1,
  wherein the coupler is connected only via a line to the output contact.

6. The radar transmitter as claimed in claim 1,
  wherein a local oscillator, the transmit channel, and the phase controller circuit are integrated into a monolithically microwave integrated circuit,
  wherein the local oscillator is designed to output the local oscillator signal.

7. The radar transmitter as claimed in claim 1,
  wherein a local oscillator, which is designed to output the local oscillator signal, is integrated into a first monolithically microwave integrated circuit, and
  wherein the transmit channel and the phase controller circuit are integrated into a second monolithically microwave integrated circuit.

8. The radar transmitter as claimed in claim 1,
  wherein a local oscillator is designed to generate an unmodulated signal as the local oscillator signal.

9. The radar transmitter as claimed in claim 1,
  wherein the phase controller circuit is active while the transmit channel outputs a frequency-modulated signal as the HF radar signal for a radar measurement.

10. A method, comprising:
  generating a high-frequency (HF) radar signal based on a local oscillator signal in a transmit channel of a radar transmitter;
  decoupling a part of a power of the HF radar signal using a coupler connected to an output of the transmit channel to provide a first HF radar signal;
  reducing a frequency of the local oscillator signal using a first frequency divider and reducing a frequency of the first HF radar signal using a second frequency divider;
  generating a phase difference signal indicating a phase difference between the frequency-reduced first HF radar signal and the frequency-reduced local oscillator signal,
    wherein the phase difference signal comprises a pulse width modulated signal with a duty cycle representing a phase difference between the local oscillator signal and the HF radar signal; and
  adjusting a phase of the HF radar signal based on the phase difference signal using a phase shifter disposed in the transmit channel.

11. The method as claimed in claim 10, wherein the adjusting the phase of the HF radar signal includes:
  generating the phase difference signal in a logic circuit; and
  determining an input phase value for the phase shifter based on the phase difference signal.

12. The method as claimed in claim 10,
  wherein the local oscillator signal is frequency-modulated for performance of a radar measurement in order to generate a sequence of chirps, resulting in a corresponding frequency-modulated HF radar signal; and
  wherein the phase of the HF radar signal is continuously adjusted during the radar measurement.

13. A radar system, comprising:
  at least one transmit antenna;
  at least one receive antenna; and
  a radar device coupled to the at least one transmit antenna and the at least one receive antenna, wherein the radar device is configured to:
    receive a local oscillator signal;
    generate a high-frequency (HF) radar signal based on the local oscillator signal;

set a phase of the HF radar signal based on an input phase value; and adjust the input phase value based on a phase difference between the local oscillator signal and the HF radar signal, wherein a first signal related the local oscillator signal is reduced using a first frequency divider and a second signal related to the HF radar signal is reduced using a second frequency divider, wherein a phase difference signal which indicates the phase difference between the local oscillator signal and the HF radar signal is generated, and wherein the input phase value is determined based on the phase difference signal.

14. The radar system as claimed in claim 13, wherein the radar device is further configured to:

reduce the frequency of the local oscillator signal or a frequency of the HF radar signal by a factor.

15. The radar system as claimed in claim 13, wherein the radar device is integrated into a single monolithically microwave integrated circuit.

16. The radar system as claimed in claim 13, wherein a first part of the radar device is integrated into a first monolithically microwave integrated circuit and a second part of the radar device is integrated into a second monolithically microwave integrated circuit.

17. The radar system as claimed in claim 13, wherein the radar device is further configured to:

generate an unmodulated signal as the local oscillator signal.

18. The radar system as claimed in claim 13, wherein the first frequency divider and the second frequency divider are included in a phase controller circuit.

19. The radar system as claimed in claim 13, wherein an HF signal distribution circuit is designed to receive the local oscillator signal from a local oscillator and distribute the local oscillator signal to a transmit channel.

20. The radar system as claimed in claim 13, wherein the radar device comprises a transmit channel configured to receive the local oscillator signal and to generate the HF radar signal based on the local oscillator signal, and wherein the transmit channel is integrated into a monolithically microwave integrated circuit.

* * * * *